United States Patent
Leung

(10) Patent No.: US 8,537,699 B2
(45) Date of Patent: Sep. 17, 2013

(54) MANAGING VIDEO ADAPTATION ALGORITHMS

(75) Inventor: Nikolai K. Leung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 12/756,495

(22) Filed: Apr. 8, 2010

(65) Prior Publication Data

US 2010/0316066 A1    Dec. 16, 2010

Related U.S. Application Data

(60) Provisional application No. 61/187,396, filed on Jun. 16, 2009, provisional application No. 61/232,562, filed on Aug. 10, 2009.

(51) Int. Cl.
- *H04L 1/00* (2006.01)
- *H04N 11/04* (2006.01)
- *G06F 15/16* (2006.01)

(52) U.S. Cl.
USPC ....... 370/252; 370/236; 375/240.28; 709/231

(58) Field of Classification Search
None
See application file for complete search history.

(56) References Cited

U.S. PATENT DOCUMENTS

| | | | |
|---|---|---|---|
| 7,400,588 B2 * | 7/2008 | Izzat et al. | 370/252 |
| 8,027,206 B2 | 9/2011 | Yoon et al. | |
| 8,095,680 B2 * | 1/2012 | Pettersson et al. | 709/231 |
| 8,189,616 B2 * | 5/2012 | Frankkila | 370/465 |
| 2003/0152032 A1 * | 8/2003 | Yanagihara et al. | 370/236.1 |
| 2005/0257111 A1 * | 11/2005 | Nagai et al. | 714/745 |
| 2007/0025301 A1 | 2/2007 | Petersson et al. | |
| 2007/0091815 A1 | 4/2007 | Tinnakornsrisuphap et al. | |
| 2008/0095247 A1 * | 4/2008 | Ohno et al. | 375/240.28 |
| 2008/0298243 A1 | 12/2008 | Martinotti et al. | |
| 2009/0021572 A1 | 1/2009 | Garudadri et al. | |

(Continued)

FOREIGN PATENT DOCUMENTS

| | | |
|---|---|---|
| EP | 1202487 | 5/2002 |
| EP | 1821442 | 8/2007 |

(Continued)

OTHER PUBLICATIONS

Nguyen Huu Thanh et al., "Link Estimation and Rate Control for Optimized Video Streaming on Overlay Networks," HUT-ICCE 2006 First International Conference on Communications and Electronics, Oct. 10-11, 2006, pp. 58-65.

(Continued)

*Primary Examiner* — Clemence Han
(74) *Attorney, Agent, or Firm* — Elaine H. Lo

(57) ABSTRACT

Techniques are described for controlling the operation of a dynamic rate adaptation algorithm by modifying control parameters exposed by the dynamic rate adaptation algorithm. In one aspect, an apparatus comprises a rate adaptation module comprising a plurality of control parameters. The rate adaptation module monitors conditions of a network and adjusts a coding rate of a media encoder based on the network conditions and the plurality of control parameters. Each of the plurality of control parameters specifies a threshold value or a timing value that controls a response of the rate adaptation algorithm to the network conditions. The apparatus also comprises a client that receives a value for a first one of the plurality of control parameters and sets the first control parameter to the received value.

39 Claims, 8 Drawing Sheets

(56) References Cited

U.S. PATENT DOCUMENTS

| | | | |
|---|---|---|---|
| 2009/0067335 A1* | 3/2009 | Pelletier et al. | 370/238 |
| 2009/0164655 A1* | 6/2009 | Pettersson et al. | 709/231 |
| 2010/0195521 A1* | 8/2010 | Wanstedt et al. | 370/252 |

FOREIGN PATENT DOCUMENTS

| | | |
|---|---|---|
| WO | 03014873 A2 | 2/2003 |
| WO | 2006054442 A1 | 5/2006 |
| WO | 2010088441 A1 | 8/2010 |

OTHER PUBLICATIONS

Dapeng Wu et al., "On End-to-End Architecture for Transporting MPEG-4 Video Over the Internet," IEEE Transactions on Circuits and Systems for Video Technology, vol. 10, No. 6, Sep. 2000.

3GPP TS 26.234: "3rd Generation Partnership Project; Technical Specification Group Services and System Aspects; Transparent end-to-end Packet-switched Streaming Service (PSS); Protocols and Codecs (Release 9)," V9.0.0, Sep. 2009.

Ingemar Johansson, "VoIP Shim for RTP Payload Formats," Ericsson AB, Sep. 2006.

International Search Report and Written Opinion—PCT/US2010/038756, International Searching Authority—European Patent Office, Nov. 4, 2010.

Kyunghun Jung "Transition from Circuit-switched to Packet-switched 3G Mobile Multimedia Telephony" World of Wireless, Mobile and Multimedia Networks and Workshops, 2009. WoWMoM 2009. IEEE International Symposium Jun. 15, 2009.

Rejaie, R., et al., "Architectural considerations for playback of quality adaptive video over the internet" NETWORKS, 2000. (ICON 2000). Proceedings. IEEE International Conference on Sep. 5-8, 2000, Piscataway, NJ, USA, IEEE, pp. 204-209, XP010514101.

Singh V., et al., "Rate Adaptation for Conversational 3G Video" INFOCOM Workshops 2009, IEEE, Piscataway, NJ, USA, Apr. 19, 2009, pp. 1-7, Section II "Overview of Rate Adaptation Techniques", Section III "New Rate Adaptation techniques", figures 1, 2 algorithm 1, XP031473338.

algorithm 1, XP031473338.

Shao B., et al., "A Multimedia Terminal Supporting Adaptation for QoS Control", Ninth International Workshop on Image Analysis for Multimedia Interactive Services, WIAMIS 2008, pp. 113-116, [online], May 2008, IEEE Computer Society, <URL: http://ieeexplore.ieee.org/xpls/abs_all.jsp?arnumber=4556897>.

Sugano M et al., "2. Metadata Specifications and Service Scenarios, 2-2. Metadata Services for Mobile Phones", Journal of The Institute of Image Information and Television Engineers, The Institute of Image Information and Television Engineers, Feb. 1, 2007, vol. 61, No. 2, pp. 141-145.

Wien M., et al., "Real-Time System for Adaptive Video Streaming based on SVC", JVT-U140-M, Oct. 2006.

\* cited by examiner

| MEDIA RECEIVER PARAMETERS | |
|---|---|
| PLR_MAX | 81A |
| PLR_LOW | 81B |
| PLR_M_WINDOW_MAX | 81C |
| PLR_M_WINDOW_LOW | 81D |
| TARGET_PLAYOUT_MARGIN_MIN | 81E |
| TARGET_PLAYOUT_MARGIN_HI | 81F |
| X_PERCENTILE | 81G |
| TARGET_PLAYOUT_M_WINDOW_MIN | 81H |
| TARGET_PLAYOUT_M_WINDOW_HI | 81I |
| PL_BURST | 81J |
| PL_BURST_WINDOW | 81K |
| MAX_RTP_GAP | 81L |
| INC_FBACK_MIN_INTERVAL | 81M |
| DEC_FBACK_MIN_INTERVAL | 81N |
| DECONGEST | 81O |
| DECONGEST_TIME | 81P |

| MEDIA SENDER PARAMETERS | |
|---|---|
| MIN_BIT_RATE | 83A |
| MIN_FRAME_RATE | 83B |
| MIN_IMAGE_QUALITY | 83C |
| RAMP_UP_RATE | 83D |
| RAMP_DOWN_RATE | 83E |
| UPLINK_RA | 83F |
| DROP_HOLD_VIDEO | 83G |
| INITIAL_CODEC_RATE | 83H |

FIG. 3

MANAGING VIDEO ADAPTATION ALGORITHMS

This application claims the benefit of U.S. Provisional Application No. 61/187,396 filed on Jun. 16, 2009, and also claims the benefit of U.S. Provisional Application No. 61/232,562 filed on Aug. 10, 2009, the entire content of each of which is incorporated herein by reference.

TECHNICAL FIELD

This disclosure relates to digital video coding and, more particularly, techniques for controlling video coding rate.

BACKGROUND

Digital video capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the emerging ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Dynamic rate adaptation techniques are used to adjust the number of coding bits, i.e., the coding rate, allocated to a video stream. Coding rates may be adjusted to ensure that the encoded video sequence conforms to quality requirements and/or changes to the available bandwidth caused by varying network conditions. Some rate control techniques are designed to produce a constant coding rate, while other rate control techniques are designed to produce constant quality. Dynamic rate adaptation techniques may balance coding rate and quality level, and be responsive to network congestion conditions and video frame content.

SUMMARY

This disclosure describes techniques for managing dynamic rate adaptation algorithm implementations. In general, the particular dynamic rate adaptation algorithm used may vary from device to device according to the implementations offered by the device manufacturers. However, the devices can use the services of any number of different networks having varying characteristics that affect the performance of the implementation-specific dynamic rate adaptation algorithms running on the devices. In accordance with the techniques described herein, the dynamic rate adaptation algorithms expose a set of parameters that network operators may use to modify the operation of the dynamic rate adaptation algorithms.

In one aspect, a method comprises receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions. The method further comprises setting the first control parameter to the value.

In another aspect, an apparatus comprises a rate adaptation module comprising a plurality of control parameters, wherein the rate adaptation module monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions. The apparatus further comprises a client that receives a value for a first one of the plurality of control parameters and sets the first control parameter to the value.

In another aspect, a device comprises means for receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions. The device further includes means for setting the first control parameter to the value.

In another aspect, a computer-readable storage medium comprises instructions that cause one or more programmable processors to receive, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions. The instructions further cause one or more programmable processors to set the first control parameter to the value.

The techniques described in this disclosure may be implemented in a digital video apparatus in hardware, software, firmware, or any combination thereof. If implemented in software, the software may be executed in a machine such as a processor. The software may be initially stored as instructions in a machine-readable storage medium and executed by the machine to support video coding rate adaptation, in accordance with this disclosure.

The details of one or more examples of these techniques are set forth in the accompanying drawings and the description below. Other features, objects, and advantages will be apparent from the description and drawings, and from the claims.

BRIEF DESCRIPTION OF DRAWINGS

FIG. 3 is a block diagram illustrating tables of exemplary parameters that may be used, in accordance with the techniques described, to control rate adaptation algorithms.

DETAILED DESCRIPTION

Figure 1:
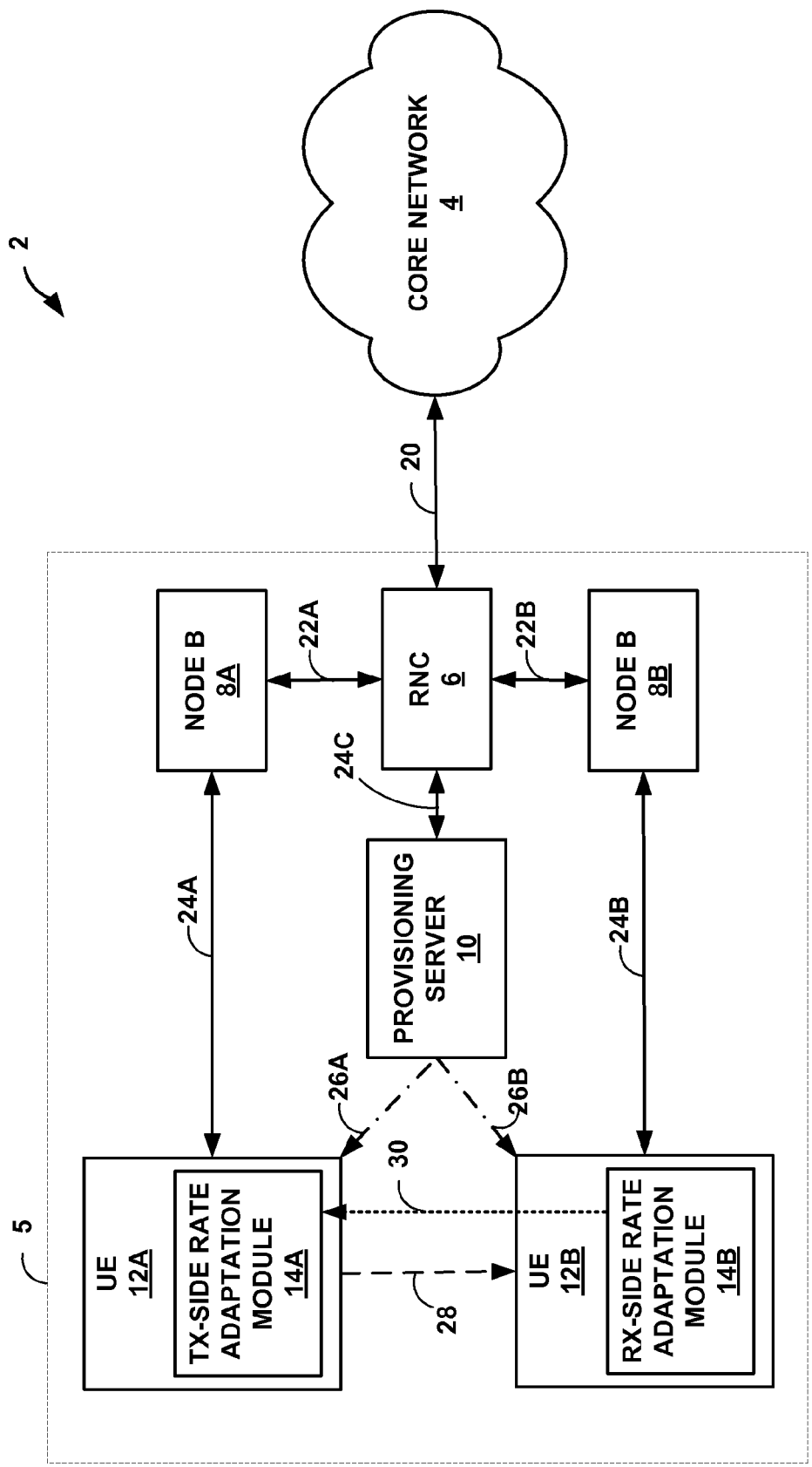
FIG. 1 is a block diagram illustrating an exemplary network that operates in accordance with the techniques described.

FIG. 1 is a block diagram illustrating an exemplary network 2. In some examples, network 2 comprises a Universal Mobile Telephony Service (UMTS) network that operates in accordance with the 3rd Generation Partnership Project (3GPP) standards and with the techniques herein described. For purposes of illustration only, the techniques herein will be described with respect to a UMTS network. However, the techniques are applicable to other communication network types in other examples.

UMTS network 2 includes a core network 4 and a UMTS Terrestrial Radio Access Network (UTRAN) 5 communicatively coupled via communication interface 20. Core network 4 provides packet-switched (PS) services and may in some aspects further provide circuit-switched (CS) services. The PS and CS services can include mobility services, such as authentication and roaming, as well as call handling services, core network signaling, billing, internetworking between core network 4 and external networks (not shown), and other services. Core network 4 may be connected to one or more backbone networks, such as the Internet, the Integrated Services Digital Network (ISDN), and the Public Switched Telephone Network (PSTN) (not shown).

Communication interface 20 provides UTRAN 5 with access to core network 4 services. Communication interface 20 enables an Iu-ps interface and may in some aspects further comprise an Iu-cs interface. In general, an Iu-ps interface provides protocols that enable communication with a packet-switched network and may link Radio Network Controller 6 ("RNC 6") to a Serving GPRS Support Node (SGSN) (not shown) in core network 4. In general, an Iu-cs interface provides protocols that enable communication with a circuit-switched network and may link RNC 6 to a Mobile Switching Center (MSC) (not shown) in core network 4.

UTRAN 5 provides wireless communication services and includes two base stations in the example of FIG. 1, NodeB 8A and NodeB 8B ("NodeBs 8"), that are connected to a RNC 6 via communication links 22A-22B. NodeBs 8 are base transceiver stations that use an air interface to communicate with wireless devices. Each of NodeBs 8 may serve several cells (or "sectors") according to its configuration. Hereinafter, the geographic region served by one of NodeBs 8 is referred to as a cell. In some aspects, each of NodeBs 8 may be a site controller, access point, or other types of wireless transceiver station.

In UTRAN 5, NodeBs 8 are communicatively coupled to wireless user equipment (UE) 12A-12B ("UE 12") using radio links 24A-24B. Specifically, UE 12A is in the cell of and therefore exchanges data and control information with NodeB 8A via radio link 24A. Likewise, UE 12B is in the cell of and therefore exchanges data and control information with NodeB 8B via radio link 24B. Each of UE 12 is a wireless communication device and may comprise, for example, a mobile telephone, a laptop or desktop computer having, e.g., a 3G wireless card, a wireless-capable netbook, a video game device, a pager, a personal data assistant (PDA), a television, or a video camera. Each of UE 12 run one or more applications, such as mobile calls, video games, videoconferencing, and email, among others. Communication from a UE 12 to one of nodes 8 is known as an uplink, and communication from one of NodeBs 8 to a UE 12 is known as the downlink. RNC 6 manages NodeBs 8, routes data to/from NodeBs 8, and interfaces UTRAN 5 to core network 4 via communication interface 20. In some aspects, UTRAN 5 may comprise additional RNCs and NodeBs arranged in various configurations.

UMTS network 2 may comprise a packet-switched network and, as a result, can rapidly re-assign link resources among different users and applications as demands for the resources vary. UMTS network 2 provides downlink packet data services. For example, UMTS network 2 may provide the High Speed Downlink Packet Access (HSDPA) service. The HSDPA service may operate in either Frequency Division Duplex (FDD) mode or Time Division Duplex (TDD) mode.

HSDPA specifies that radio links 24 comprise a High-Speed Downlink Shared Channel (HS-DSCH), referred to hereinafter as a shared downlink. That is, UE 12 in the cell of one of NodeBs 8 share a HS-DSCH provided by the NodeB and communicated via radio links 24. NodeBs 8 schedule a corresponding shared downlink based on current radio conditions experienced by any connected UE 12 as well as the data needs of the connected UE 12. For example, as UE 12A moves around the cell of NodeB 8A, the characteristics of radio link 24A changes due to changes in geometry, weather, interference, and other conditions. As one example, a UE closer to the edge of the cell generally has significantly poorer link conditions compared to a UE near the NodeB 8A transmitter. To optimize system capacity the NodeB 8A scheduler chooses to serve the UE in the best link conditions since this allows the fastest transmission rate on the shared downlink (i.e., the HS-DSCH). This channel-sensitive scheduling exploits multi-UE diversity to improve cell throughput by favoring terminals that can receive data from the shared downlink at higher rates.

UMTS network 2 services may specify Quality of Service (QoS) classes for four types of traffic: 1) conversational (e.g., Voice over IP (VoIP), video telephony, video gaming); 2) streaming (e.g., multimedia, video on demand, webcast); 3) interactive (web browsing, network gaming, database access); and 4) background (email, SMS, downloading). UTRAN 5 grants QoS levels as needed to applications running on UE 12. NodeBs 8 temper the objective of maximizing system throughput and capacity with the need to provide fairness to all UE 12 in the cell and the need to meet the particular QoS requirements of applications running on UE 12. These objectives often conflict.

A shared downlink load for one of NodeBs 8 may increase when, for instance, one of UE 12 in the cell starts new multimedia or data sessions that have QoS requirements. In some cases, additional media or data sessions can carry higher priority traffic such as VoIP which can pre-empt video RTP traffic. As another example, the load may increase when one of UE 12 is handed off into the cell, and when one of UE 12 that requires QoS on the shared downlink moves towards the edge of the cell. A lower quality radio link makes it more costly for the shared downlink to support transmission to a UE 12 that moves toward the edge of the cell. For example, by having to provide a high-rate, low-latency QoS on the shared downlink to a UE 12 on the edge of a cell for one of NodeBs 8, the NodeB needs to assign the shared downlink to that particular UE 12 for longer periods to compensate for the slower link speed. This loads the shared downlink and reduces its capacity to serve other ones of UE 12 in the cell.

Due to the shared nature of the shared downlink, the requirements for each of UE 12 in a cell affect the performance of all UE 12 in the cell. This can result in variations in the QoS delivered to some or all of the UE 12 in the cell. While a well-designed HSDPA QoS scheduler balances the need to provide QoS and fairness with the objective of maximizing system throughput, the factors explained above contribute to variations in the actual QoS granted to a terminal during a session. Even when UTRAN 5 has granted a particular QoS level (e.g., a 48 kbps data rate) to an application for one of UE 12, the UTRAN 5 may not be able to provide that QoS level to that UE 12 at every instant. In such instances, the UE 12 will experience variations in the delivered QoS level based on changes in its relative location to other UE 12 in a cell due to mobility and the cell loading/congestion caused by the other UE 12.

HSDPA provides support for various end-to-end multimedia services. For example, for real-time packet-switched services, UMTS network 2 may implement the 3GPP-defined Packet Switched Conversational (PSC) services, Packet Switched Streaming (PSS) services, and Multimedia Broadcast/Multimedia Service (MBMS) services.

In addition, exemplary UMTS network 2 may provide Multimedia Telephony Service for Internet Protocol Multimedia Systems (MTSI). MTSI is defined in "3GPP TS 26.114 V7.10.0," 3rd Generation Partnership Project, Technical Specification Group Services and System Aspects, 2009, available at http://www.3gpp.org/ftp/Specs/archive/26_series/26.114/26114-7a0.zip. As described in detail below, UE 12 comprise MTSI clients and, as such, support speech, video and/or text transported over Real-time Transport Protocol (RTP).

UE 12A may send RTP packets containing video data, as an aspect of video session 28, through UMTS network 2 to UE 12B using MTSI. Video session 28 may be a video call, a videoconference, a streaming movie, or other multimedia session requiring video transmission. UE 12 specifies media codecs for each of the supported media types, including video. UE 12A includes a video encoder that encodes video obtained from a video source, which may be a live or archived video feed, according to any of a variety of video coding standards. The techniques may be used with any of a variety of video encoding standards, such as the MPEG-1, MPEG-2, or MPEG-4 standards, the ITU H.263 or H.264 standards, or the ISO/IEC MPEG-4, Part 10 standard, i.e., Advanced Video Coding (AVC), which is substantially identical to the H.264 standard. In addition, UE 12A includes a transmission-side rate adaptation module 14A (illustrated as "TX-side rate adaptation module 14A") that controls the coding rate applied by the video coder to encode frames within a video segment. The coding rate specifies the number of coding bits allocated to the frames in the video segment.

Transmission-side rate control module 14A employs a dynamic rate adaptation algorithm that enables the UE 12A video encoder to respond to changing network conditions. For example, a transmission-side rate adaptation module 14A may increase the quantization parameter (QP) used by the video encoder to decrease the bitrate of the encoded media in response to a reduction in the bandwidth allotted for the encoded media. The bandwidth allotted for encoded media may change, for instance, due to variations in the delivered QoS level experienced by a receiving one of UE 12.

UE 12B may receive and process RTP packets received during video session 28 from UE 12A. UE 12B comprises receiver-side rate adaptation module 14B, which measures packets arrival statistics on the shared downlink. Based on the measurements, receiver-side rate adaptation module 14B provides feedback 30 that directs transmission-side rate adaptation module 14A to scale down or scale up its encoding rate and, consequently, its media transmission rate to more nearly match the bandwidth provision for UE 12B on the shared downlink.

In general, user equipment vendors implement transmission-side rate adaptation module 14A and receiver-side rate adaptation module 14B in order to facilitate the best adaptation methods specific to the user equipment devices. As a result, UTRAN 5 in various aspects may include UE 12 that have different proprietary implementations of rate adaptation modules 14.

In accordance with the techniques herein described, transmission-side rate adaptation module 14A exposes a set of control parameters that affects the rate adaptation and encoding algorithms for UE 12A. In addition, receiver-side rate adaptation module 14B exposes a different set of control parameters that affects rate adaptation and encoding algorithms for UE 12B.

In accordance with the described techniques, UTRAN 5 further comprises provisioning server 10 that is communicatively coupled to RNC 6 via communication link 24C. In some aspects, provisioning server 10 provisions UE 12 using other wireless interfaces, such as Bluetooth, IrDA, or wired interfaces such as Universal Serial Bus (USB), Firewire, and RS-232. Provisioning server 10 is typically a computer server in UMTS network 2. In some aspects, the provisioning server 10 is a laptop with a wired connection one or more of UE 12. In some aspects, provisioning server 10 is a user equipment according to 3GPP nomenclature and may comprise, for example, a mobile telephone, a laptop or desktop computer having, e.g., a 3G wireless card, a wireless-capable netbook, a personal data assistant (PDA), and the like.

Provisioning server 10 establishes, separately or in combination, provisioning sessions 26A-26B with UE 12A-12B to modify the control parameters exposed by transmission-side rate adaptation module 14A and receiver-side rate adaptation module 14B, as described in this disclosure, and thereby alter the rate adaptation and encoding algorithms operating within the UTRAN 5. In this manner, although the rate adaptation and encoding algorithms of UE 12 are proprietary, provisioning server 10 nevertheless controls operation of the these algorithms to facilitate efficiency, QoS, throughput, or other objectives for UTRAN 5. As one example, provisioning server 10 may, via provisioning session 26A, direct transmission-side rate adaptation module 14A to, in response to detecting packet congestion, reduce the video encoding rate to reduce the transmission rate of video session 28 and thereby reduce the burden of video session 28 on the shared downlink (comprised by radio link 24B) used by UE 12B. This reduction may, for instance, allow other user equipment (not shown) that utilize the shared downlink to have a more consistent or a better QoS.

Figure 2:
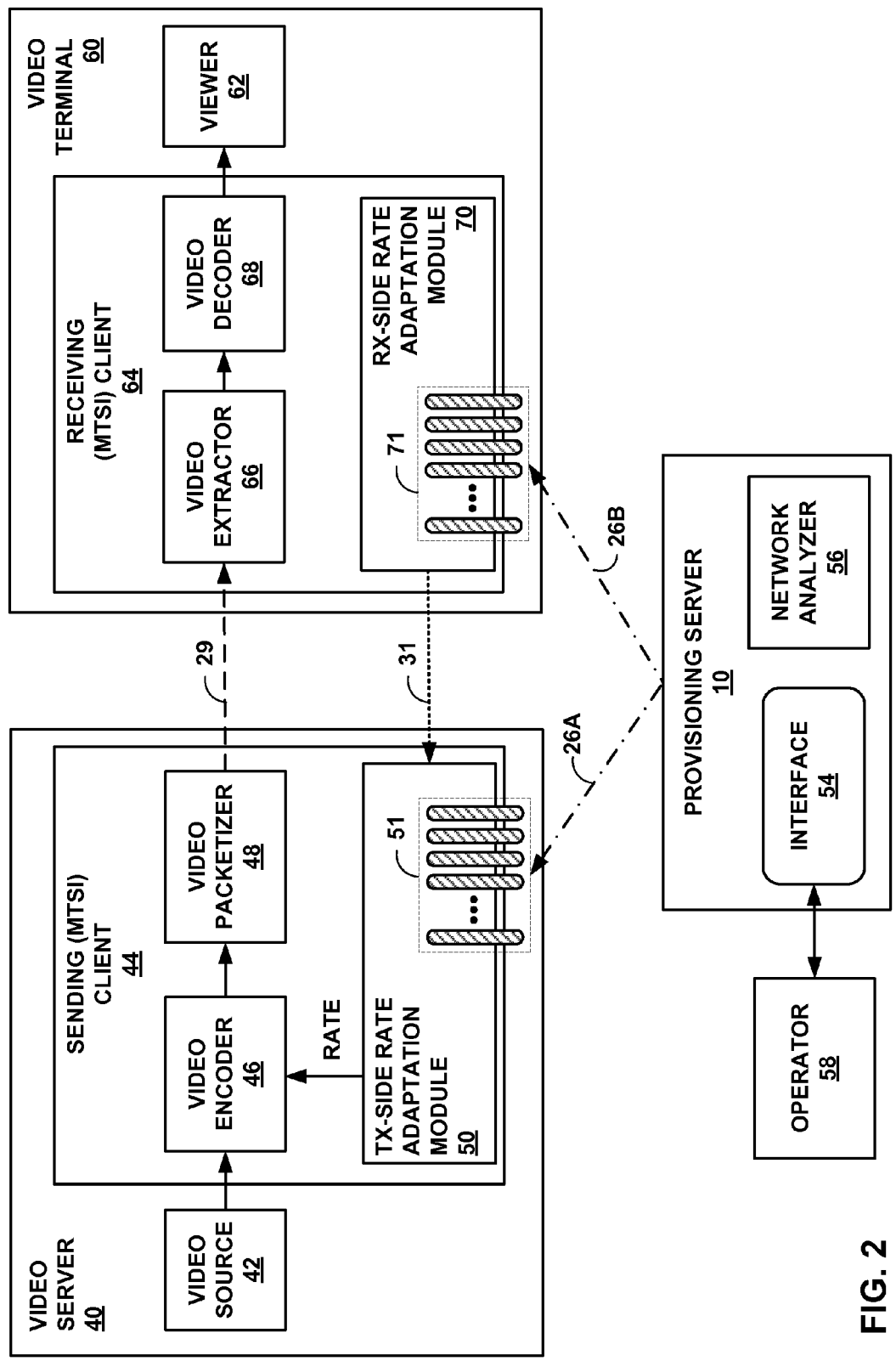
FIG. 2 is a block diagram illustrating an example video server and video terminal having rate adaptation algorithms that are modifiable using an exemplary provisioning server according the techniques described herein.

FIG. 2 is a block diagram illustrating an example video server 40 and video terminal 60 having rate adaptation algorithms that are modifiable using an exemplary provisioning server 10 according the techniques described herein.

Video server 40 may correspond to UE 12A of FIG. 1. Video server 40 comprises a video source 42 and a sending client 44. In the illustrated, exemplary aspect of FIG. 2, sending client 44 is a MTSI client. Sending client 44 is hereinafter referred to as sending MTSI client 44. Video source 42 may be a video capture device such as a video camera, or a video archive that stores previously captured digital video. Video source 42 also may be an interface to a live or archived video feed.

Sending MTSI client 44 supports and otherwise provides an interface for video server 40 to MTSI and enables video server 40 to transmit conversational speech, text, and video. Sending MTSI client 44 handles session setup and control for media sessions with other MTSI clients and additionally handles media control, media encoding/decoding, and media data and control data transport.

Sending MTSI client 44 comprises video encoder 46, video packetizer 48, and transmission-side rate adaptation module 50 ("TX-side rate adaptation module 50"). Sending MTSI client 44 is a simplified, exemplary aspect of a generalized MTSI client. In other aspects, sending MTSI client 44 may additionally comprise a video decoder, text and speech codecs, a session setup and control module, activation modules, or other functional aspects that enable MTSI.

Video encoder 46 encodes video from video source 42 according to any of a variety of video coding standards, such as H.264, as mentioned above. Video packetizer 48 is a packet-based interface that receives the encoded video segment from video encoder 46 and divides the encoded video segment into a series of packets for transmission. The resulting packets may be passed from the application layer to other layers, such as the transport and physical layers, for further processing, such as multiplexing, additional packetization, and other operations.

Transmission-side rate adaptation module 50 controls the coding rate applied by video encoder 46 to encode frames within a video segment. The coding rate specifies the number of coding bits allocated to the frames in the video segment. Transmission-side rate adaptation module 50 may correspond to transmission-side rate adaptation module 14A of FIG. 1.

Transmission-side rate adaptation module 50 receives feedback 31 from receiving clients, such as receiving client 64, and responds by increasing or decreasing the coding rate as appropriate. Feedback 31 may comprise instructions directing transmission-side rate adaptation module 50 to take an action to modify the coding rate, statistics regarding received packets, or any other information that transmission-side rate adaptation module 50 can use to adjust the coding rate or the sending rate. For instance, transmission-side rate adaptation module 50 may support the Temporary Maximum Media Bit-rate Request (TMMBR) and Temporary Maximum Media Bit-rate Notification (TMMBN) messages of Codec-Control Messages (CCM).

In this exemplary aspect, transmission-side rate adaptation module 50 implements, in accordance with MTSI specifications, extended RTP Control Protocol (RTCP) feedback receipt mechanisms that transmission-side rate adaptation module 50 uses to handle RTCP feedback of receiving conditions experienced by receiving video terminals. In aspects of UMTS network 2 that implement PSS, transmission-side rate adaptation module 50 supports RTCP Next Application Data Unit (NADU) Application-Specific Functions (APP) packets that provide feedback information regarding buffer levels on video receivers for received media data.

In FIG. 2, sending client 44 sends packetized video data to video terminal 60 via MTSI video session 29. Video terminal 60 may correspond to UE 12B of FIG. 1 and comprises receiving client 64 and viewer 62. Viewer 62 enables a video terminal 60 user to view video received by video terminal 60. Viewer 62 may comprise a screen, such as a liquid-crystal display (LCD), a projector, a computer monitor, or other viewing component.

Receiving client 64 may support and otherwise provides an interface for video terminal 60 to MTSI and enables video terminal 60 to receive conversational speech, text, and video.

In the illustrated, exemplary aspect of FIG. 2, receiving client 64 is a MTSI client. Receiving client 64 is therefore hereinafter referred to as receiving MTSI client 64. Receiving MTSI client 64 handles session setup and control for media sessions with other MTSI clients and additionally handles media control, media encoding/decoding, and media data and control data transport.

Receiving MTSI client 64 comprises video decoder 68, video extractor 66, and receiver-side rate adaptation module 70. Receiving MTSI client 64 is a simplified, exemplary aspect of a generalized MTSI client. In other aspects, receiving MTSI client 64 may additionally comprise a video encoder, text and speech codecs, a session setup and control module, activation modules, or other functional aspects that enable MTSI.

Video extractor 66 is a packet-based interface that extracts video from video packets received by receiving MTSI client 64 and restores the packetized video stream. Video extractor passed the encoded video stream to video decoder 68, which decodes the encoded video stream according to the appropriate video coding standard for the stream, such as H.264, and sends the decoded video stream to viewer 62 for viewing.

Receiver-side rate adaptation module 70 monitors media packet receipt statistics for receiving MTSI client 64. Statistics monitored by receiver-side rate adaptation module 70 may include packet loss rate, packet jitter, and packet latency/delay. Based on the monitored packet statistics, receiver-side rate adaptation module 70 generates and provides feedback 31 to transmission-side rate adaptation module 50 of video server 40 to cause video encoder 46 to increase or decrease the coding rate and, concomitantly, the transmission rate of video server 40. Receiver-side rate adaptation module 70 may generate feedback 31 that comprises instructions directing transmission-side rate adaptation module 50 to take an action to modify the coding rate, packet statistics, or any other information that transmission-side rate adaptation module 50 can use to adjust the coding rate or the sending rate. For instance, receiver-side rate adaptation module 70 supports TMMBR and TMMBN messages. In this exemplary aspect, receiver-side rate adaptation module 70 implements, in accordance with MTSI specifications, extended RTP Control Protocol (RTCP) feedback mechanisms to report receiving conditions to transmission-side rate adaptation module 50 in feedback 31.

In aspects of UMTS network 2 that implement PSS, receiver-side rate adaptation module 70 may use RTCP Next Application Data Unit (NADU) Application-Specific Functions (APP) packets to provide feedback information regarding buffer levels for received encoded media data to transmission-side rate adaptation module 50. In such aspects, transmission-side rate adaptation module 50 responds by scaling up/down its encoding rate as appropriate.

In accordance with the techniques of this disclosure, transmission-side rate adaptation module 50 exposes a set of media sender control parameters 51. The media sender control parameters affect the operation of transmission-side rate adaptation module 50 by, for instance, changing boundary conditions relating to image quality, changing timing parameters, and modifying scaling rates used by transmission-side rate adaptation module 50 to determine the coding rate of video encoder 46. In some aspects, the media sender control parameters 51 exposed by transmission-side rate adaptation module 50 may be read to determine the current values of the parameters.

Similarly, in accordance with the techniques of this disclosure, receiver-side rate adaptation module 70 exposes a set of media receiver control parameters 71. The media receiver control parameters affect the operation of receiver-side rate adaptation module 70 by, for instance, changing boundary and timing conditions relating to the calculation of a packet loss rate, changing timing parameters, and other values used by received-side rate adaptation module 70 to determine the nature and scope of feedback 31 provided to transmission-side rate adaptation module 50. In some aspects, the media sender control parameters 51 exposed by transmission-side rate adaptation module 50 may be read to determine the current values of the parameters.

The internal encoding and rate adaptation algorithms for MTSI clients may often be proprietary and/or unavailable. Accordingly, video encoder 46, transmission-side rate adaptation module 50, and receiver-side rate adaptation module 70 may comprise "black boxes" that network operators, using conventional methods, are unable to control. However, by varying one or more of media sender control parameters 51 and/or media receiver control parameters 71 using the techniques of this disclosure, a network operator can modify the operation of transmission-side rate adaptation module 50 and/or receiver-side rate adaptation module 70, respectively, and therefore effectively change the encoding rate of video encoder 46. In this respect, a network operator can modify the operation of the "black boxes" using the control parameters as "control knobs" in order to facilitate various objectives for a network that includes video server 40 and video terminal 60. Media receiver control parameters 71 and media sender control parameters 51 thus configure and control the processes with which video terminal 60 and video server 40, respectively, react to changing network conditions. In some aspects, media receiver control parameters 71 and media sender control parameters 51 only change except when explicitly altered by a network operator. In such aspects, the parameters to not vary in response to changing network conditions.

Provisioning server 10 is a user equipment that enables a network operator 58 ("operator 58") to establish provisioning sessions 26A-26B with video server 40 and video terminal 60 in order to modify media sender control parameters 51 and media receiver control parameters 71, respectively. Provisioning server 10 includes interface 54 with which operator 58 can interact to cause provisioning server 10 to modify media sender control parameters 51 and/or media receiver control parameters 71 to values selected by operator 58. Provisioning server 10 further includes network analyzer 56 that collects and analyzes network statistics for the network that includes video server 40 and video terminal 60, e.g., UMTS network 2 of FIG. 1. In some aspects, network analyzer 56 uses provisioning session 26A to read media sender control parameter values 51 from video server 40 and/or provisioning sessions 26B to read media receiver control parameter values 71 from video terminal 60. Network analyzer 56 may use the parameter values to analyze the network conditions in light of the current configuration of video server 40 and/or video terminal 60 and provide the analysis to operator 58 via interface 54. Network analyzer 56 in such aspects may also provide the parameter values to operator 58 via interface 54.

By using provisioning server 10 to modify media sender control parameters 51 and media receiver control parameters 71, operator 58 can change the behavior of the "black boxes" of video encoder 46, transmission-side rate adaptation module 50, and receiver-side rate adaptation module 70 in order to facilitate certain network objectives, such as bandwidth equity, maximum throughput, or other such objectives. In some aspects, provisioning server 10 is at least partially autonomous and can automatically respond to changed network conditions by provisioning different media sender control parameters 51 and media receiver control parameters 71 to video server 40 and video terminal 60, respectively.

FIG. 3 includes media receiver parameter table 80 and media sender parameter table 82. Media receiver parameter table 80 lists exemplary media receiver parameters 81A-81P ("media receiver parameters 81"). According to the techniques of this disclosure, exemplary receiver-side rate adaptation module 70 exposes one or more of media receiver parameters 81 to enable network operators to affect the operation of receiver-side rate adaptation module 70 and hence video terminal 60 and video server 40. Media receiver control parameters 71 of receiver-side rate adaptation module 70 may represent one or more of media receiver parameters 81. In some aspects, a video terminal 60 may provide multiple subsets of media receiver parameters 81 that correspond to different service levels provided by the network that includes video terminal 60 (service-specific subsets of media receiver parameters 81 may intersect, i.e., overlap, with one another).

In this way, a network operator may alter a service-specific subset of media receiver parameters 81 without affecting other service-specific subsets of media receiver parameters 81. For example, a video terminal 60 may provide gold-, silver-, and bronze-level services. A network operator may alter a subset of media receiver parameters 81 that corresponds to the bronze service level in order to affect the quality of service of the network for video terminal 60 when it is operating at the bronze service level. The following paragraphs describe each of media receiver parameters 81. In some aspects, time-related ones of media receiver parameters 81 are denominated in milliseconds.

PLR_MAX 81A specifies an upper threshold for Packet Loss Rate (PLR), a statistical measuring of the percentage of packets that are not received by video terminal 60. PLR may be measured with respect to RTP packets. In some aspects, PLR includes (as losses) those RTP packets that do not arrive in time for their properly scheduled playout. When PLR exceeds PLR_MAX 81A, receiver-side rate adaptation module 70 directs transmission-side rate adaptation module 50 to reduce the packet loss rate.

PLR_LOW 81B specifies a lower threshold for PLR. When PLR drops below PLR_LOW 81B, receiver-side rate adaptation module 70 directs transmission-side rate adaptation module 50 to increase the media transmission rate.

PLR_M_WINDOW_MAX 81C specifies the duration of a sliding window over which receiver-side rate adaptation module 70 observes and computes PLR for the purpose of comparing with PLR_MAX 81A.

PLR_M_WINDOW_LOW 81D specifies the duration of a sliding window over which receiver-side rate adaptation module 70 observes and computes for the purpose of comparing with PLR_MIN 81B. PLR_M_WINDOW_MAX 81C is specified separately from PLR_M_WINDOW_LOW 81D because excessive packet losses is an urgent condition that may require a rapid response by receiver-side rate adaptation module 70. As a result, a network operator may desire a shorter observation window value for PLR_M_WINDOW_MAX 81C. A low packet loss rate is not necessarily an urgent condition, and a network operator may use longer observation window value for PLR_M_WINDOW_LOW 81D to ensure that network conditions are sufficiently stable to attempt to increase the media transmission rate.

TARGET_PLAYOUT_MARGIN_MIN 81E specifies the minimum acceptable time between a media packet arrival and its properly scheduled playout time. The time is measured from playout time to the X percentile point (specified by X_PERCENTILE 81G, described below) of a packet arrival distribution. When TARGET_PLAYOUT_MARGIN_MIN 81E is not met, receiver-side rate adaptation module 70 may direct transmission-side rate adaptation module 50 to reduce the media transmission rate to enable more timely arrival of media packets. TARGET_PLAYOUT_MARGIN_MIN 81E is described in further detail below with respect to FIG. 4.

TARGET_PLAYOUT_MARGIN_HI 81F specifies an upper (maximum) threshold of time between a media packet arrival and its properly scheduled playout time. The time is measured from playout time to an X percentile point (specified by X_PERCENTILE 81G, described below) of a packet arrival distribution. When TARGET_PLAYOUT_MARGIN_HI 81F is exceeded, receiver-side rate adaptation module 70 may direct transmission-side rate adaptation module 50 to increase the media transmission rate to improve media quality, e.g., video image quality. TARGET_PLAYOUT_MARGIN_HI 81F is described in further detail below with respect to FIG. 4.

X_PERCENTILE 81G specifies the X percentile point of a packet arrival distribution that is used in conjunction with TARGET_PLAYOUT_MARGIN_MIN 81E and TARGET_PLAYOUT_MARGIN_HI 81F.

TARGET_PLAYOUT_M_WINDOW_MIN 81H specifies the duration of a sliding window over which receiver-side rate adaptation module 70 observes and computes a margin between media packet arrivals and playout. Receiver-side rate adaptation module 70 compares the calculated margin for TARGET_PLAYOUT_M_WINDOW_MIN 81H with TARGET_PLAYOUT_MARGIN_MIN 81E.

TARGET_PLAYOUT_M_WINDOW_HI 81I specifies the duration of a sliding window over which receiver-side rate adaptation module 70 observes and computes a margin between media packet arrivals and playout. Receiver-side rate adaptation module 70 compares the calculated margin for TARGET_PLAYOUT_M_WINDOW_HI 81I with TARGET_PLAYOUT_MARGIN_HI 81F.

PL_BURST 81J specifies an upper (maximum) threshold number of packet losses. When packet losses over a duration specified by PL_BURST_WINDOW 81K exceed PL_BURST 81J, receiver-side rate adaptation module 70 directs transmission-side rate adaptation module 50 to reduce the media transmission rate to adapt to bursty packet loss conditions.

PL_BURST_WINDOW 81K specifies a window over which receiver-side rate adaptation module 70 observes and calculates packet losses for comparison to PL_BURST 81J to determine a bursty packets loss condition.

MAX_RTP_GAP 81L is a factor in a threshold amount of time that may pass without receiving a media packet before receiver-side rate adaptation module 70 declares a bursty packet loss/severe congestion condition and directs transmission-side rate adaptation module 50 to adapt to bursty packet loss conditions. In cases of severe packet loss, a gap in media packets received (a packet loss gap) may prevent conventional observation of packets lost, for a subsequent packet must be received for receiver-side rate adaptation module 70 to determine that prior packets were in fact lost. Using MAX_RTP_GAP 81L and the techniques described herein allows receiver-side rate adaptation module 70 to determine congestion without having to observe a media packet after intervening packet losses.

Receiver-side rate adaptation module 70 may, in some cases, calculate the threshold amount of time for determining when there is a packet loss gap by keeping a running estimate (e.g., a moving average), T_FRAME_EST, of the frame period based on the reception of previous video frames and the timestamps for the previous video frames. Timestamps of received media (e.g., RTP) allow receiver-side rate adaptation module 70 to estimate a frame period based on recently received video frames. If receiver-side rate adaptation module 70 fails to receive any media packets for a duration of the value of the product of MAX_RTP_GAP 81L and T_FRAME_EST, then receiver-side rate adaptation module 70 declares a bursty packet loss/severe congestion condition and may direct transmission-side rate adaptation module 50 to reduce the media transmission rate to adapt.

Estimating a packet loss gap may be challenging because media packets may not be generated at regular intervals, and shared downlink scheduling algorithms can cause jitter in packet delivery times. Therefore, in some aspects, MAX_RTP_GAP 81L is set conservatively.

Exemplary receiver-side rate adaptation module 70 uses T_FRAME_EST because encoders do not often abruptly change the encoding frame rate and hence the estimate can serve as a fairly reliable basis for detecting gaps in the transport of video frames. In some aspects, other methods for estimating the frame period may be used.

INC_FBACK_MIN_INTERVAL 81M specifies a minimum interval that receiver-side rate adaptation module 70 is to wait before sending a subsequent feedback 31 message, e.g., a TMMBR message, to transmission-side rate adaptation module 50 that increases the maximum rate limit. INC_FBACK_MIN_INTERVAL 81M influences the rate at which dynamic rate adaptation occurs as well as the signaling over (a lower interval leads to a greater number of feedback messages).

DEC_FBACK_MIN_INTERVAL 81N specifies a minimum interval that receiver-side rate adaptation module 70 is to wait before sending a subsequent feedback 31 message, e.g., a TMMBR message, to transmission-side rate adaptation module 50 that decreases the maximum rate limit. DEC_FBACK_MIN_INTERVAL 81N influences the rate at which dynamic rate adaptation occurs as well as the signaling over. Congestion often requires urgent adaptation while increasing a transmission rate is less necessary, therefore DEC_FBACK_MIN_INTERVAL 81N is a parameter separate from and is usually less than INC_FBACK_MIN_INTERVAL 81M.

DECONGEST 81O specifies a level of intensity for decongestion actions. When receiver-side rate adaptation module 70 detects a congestion condition, e.g., based on observations and calculations relating to other ones of media receiver parameters 81, receiver-side rate adaptation module 70 takes action to direct transmission-side rate adaptation module 50 to decongest the shared downlink prior to having the video server 40 transmit media at the sustainable throughput rate of the transmission path. In some aspects, DECONGEST 81O specifies a parameter value that ranges from 0 to 10, where 0 indicates that no decongestion should be performed and increasing values indicate that receiver-side rate adaptation module 70 should take increasingly aggressive decongestion actions.

DECONGEST_TIME 81P specifies an amount of time that receiver-side rate adaptation module 70 is to decongest. A value of 0 indicates that receiver-side rate adaptation module 70 should not attempt decongestion actions. DECONGEST_TIME 81P is described in further detail below with respect to FIG. 5.

Media sender parameter table 82 lists exemplary media sender parameters 83A-83H ("media sender parameters 83"). According to the techniques of this disclosure, exemplary transmission-side rate adaptation module 50 exposes one or more of media sender parameters 81 to enable network operators to affect the operation of receiver-side rate adaptation module transmission-side rate adaptation module 50 and hence video server 40. Media sender control parameters 51 of transmission-side rate adaptation module 50 may represent one or more of media sender parameters 83. In some aspects, video server 40 may provide multiple subsets of media sender parameters 83 that correspond to different service levels provided by the network that includes video server 40 (service-specific subsets of media sender parameters 83 may intersect, i.e., overlap, with one another). In this way, a network operator may alter a service-specific subset of media sender parameters 83 without affecting other service-specific subsets of media sender parameters 83. For example, a video server 40 may provide gold-, silver-, and bronze-level services. A network operator may alter a subset of media sender parameters 83 that corresponds to the bronze service level in order to affect the quality of service of the network for video server 40 when it is operating at the bronze service level. The following paragraphs describe each of media sender parameters 83. In some aspects, time-related ones of media sender parameters 83 are denominated in milliseconds.

MIN_BIT_RATE 83A specifies a minimum acceptable bit rate for a video encoder, e.g., video encoder 46. MIN_BIT_RATE 83A may be expressed as a percentage of the maximum bit rate supported for a video session (according to the current level of service). As a result, a network operator need not set multiple ones of MIN_BIT_RATE 83A in multiple service sets. If sending MTSI client 44 is unable to support the value of MIN_BIT_RATE 83A, sending MTSI client 44 either puts the video stream on hold or drops the video stream, based on the value of DROP_HOLD_VIDEO 83G (described below).

MIN_FRAME_RATE 83B specifies a minimum acceptable frame rate for a video encoder, e.g., video encoder 46. MIN_FRAME_RATE 83B is expressed as a percentage of the maximum frame rate supported for a video session (according to the current level of service). As a result, a network operator need not set multiple ones of MIN_BIT_RATE 83A in multiple service sets. If sending MTSI client 44 is unable to support the value of MIN_FRAME_RATE 83B, sending MTSI client 44 either puts the video stream on hold or drops the video stream, based on the value of DROP_HOLD_VIDEO 83G (described below).

MIN_IMAGE_QUALITY 83C specifies a minimum acceptable image quality for a video encoder, e.g., video encoder 46. MIN_IMAGE_QUALITY 83C may be expressed as a peak signal-to-noise ratio (PSNR) in decibels (dB). If sending MTSI client 44 is unable to support the value of MIN_IMAGE_QUALITY 83C, sending MTSI client 44 either puts the video stream on hold or drops the video stream, based on the value of DROP_HOLD_VIDEO 83G (described below).

RAMP_UP_RATE 83D specifies a rate at which a video encoder, e.g., video encoder 46, is to increase a target encoding rate to a higher rate limit. RAMP_UP_RATE 83D may be expressed in units of kbps per second. In some aspects, the higher rate limit is set by transmission-side rate adaptation module 50 according to feedback 31 from receiver-side rate adaptation module 70, which may include a TMBBR message.

RAMP_DOWN_RATE 83E specifies a rate at which a video encoder, e.g., video encoder 46, is to decrease a target encoding rate to a lower rate limit. RAMP_DOWN_RATE 83E may be expressed in units of kbps per second. In some aspects, the lower rate limit is set by transmission-side rate adaptation module 50 according to feedback 31 from receiver-side rate adaptation module 70. While ramping down is often a necessary technique to relieve congestion, ramping up can be undesirable due to sudden congestion on the transmission path. As a result, RAMP_DOWN_RATE 83E is a parameter separate from RAMP_UP_RATE 83D.

UPLINK_RA 83F is a Boolean parameter that specifies whether sending MTSI client 44 uses uplink rate adaptation, which involves using lower layer information about uplink throughput in order to adapt the encoder rate and avoid media packet congestion.

DROP_HOLD_VIDEO 83G is a Boolean parameter that specifies whether, in instances where video quality is unable to meet the minimum requirements set for MIN_BIT_RATE 83A, MIN_FRAME_RATE 83B, or MIN_IMAGE_QUALITY 83C, receiver-side rate adaptation module 70 is to put the video stream on hold or to drop the video stream. DROP_HOLD_VIDEO 83G is thus a drop or hold parameter. If receiver-side rate adaptation module 70 puts the video stream on hold, receiver-side rate adaptation module 70 may maintain QoS reservations. Otherwise, receiver-side rate adaptation module 70 drops the QoS reservations for the video stream along with the video stream itself. In some embodiments, a receiver-side rate adaptation module 70 that puts the video stream on hold may allow sending MTSI client 44 to continue transmitting other media, such as audio.

INITIAL_CODEC_RATE 83H specifies the initial rate at which an encoder, e.g., video encoder 26, is to transmit. In some aspects, INITIAL_CODEC_RATE 83H applies to audio encoders, video encoders, and/or test encoders.

Figure 4:
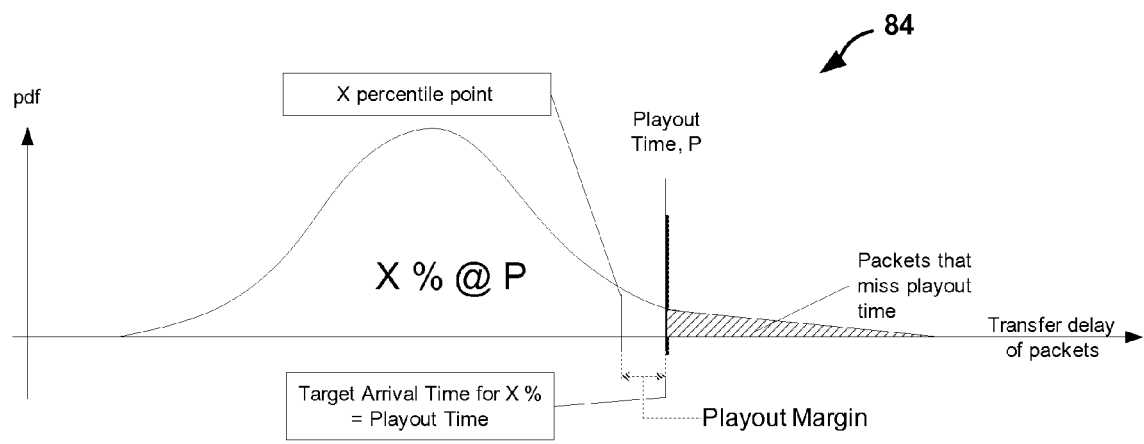
FIG. 4 is an annotated graph illustrating the playout margin as used according to the techniques described.

FIG. 4 is an annotated graph 84 illustrating the playout margin as used according to the techniques described herein. As illustrated, a playout margin for a packet is the amount of time between arrival of a media packet at a media receiver, e.g., video terminal 60, and the properly scheduled playout time for the media packet. To account for jitter in the arrival times of packets, the playout margin is measured with respect to the X percentile point in the overall packet arrival distribution for a time window.

TARGET_PLAYOUT_MARGIN_MIN 81E and TARGET_PLAYOUT_MARGIN_HI 81F define a target range for the playout for receiver-side rate adaptation module 70, while X_PERCENTILE 81G specifies the percentile of the packet arrival distribution to be used to measure the playout margin. TARGET_PLAYOUT_MARGIN_MIN 81E specifies a lower threshold for packet playout. When a playout margin for a media receiver, e.g., video terminal 60, is lower than TARGET_PLAYOUT_MARGIN_MIN 81E, receiver-side rate adaptation module 70 may direct transmission-side rate adaptation module 50 to decongest the shared downlink. TARGET_PLAYOUT_MARGIN_HI 81F specifies an upper (maximum) threshold for packet playout. When a playout margin for a media receiver, e.g., video terminal 60, is higher than TARGET_PLAYOUT_MARGIN_HI 81F, receiver-side rate adaptation module 70 may direct transmission-side rate adaptation module 50 to, for example, improve the media quality by increasing a coding rate. TARGET_PLAYOUT_M_WINDOW_MIN 81H and TARGET_PLAYOUT_M_WINDOW_HI 81I define different sliding time windows over which receiver-side rate adaptation module 70 observes packet arrivals and playout times. Minimum and high playout margins are calculated using TARGET_PLAYOUT_M_WINDOW_MIN 81H and TARGET_PLAYOUT_M_WINDOW_HI 81I for comparison with TARGET_PLAYOUT_MARGIN_MIN 81E and TARGET_PLAYOUT_MARGIN_HI 81F, respectively.

In some aspects, TARGET_PLAYOUT_M_WINDOW_MIN 81H and TARGET_PLAYOUT_M_WINDOW_HI 81I are different values to account for the different priorities that network operators place on relieving congestion and improving media quality. Network conditions that cause the playout margin to be too low may compel immediate adaptation by receiver-side rate adaptation module 70 and transmission-side rate adaptation module 50. As a result, TARGET_PLAYOUT_M_WINDOW_MIN 81H may be set smaller than TARGET_PLAYOUT_M_WINDOW_HI 81I, which receiver-side rate adaptation module 70 uses to detect larger playout margins.

Figure 5:
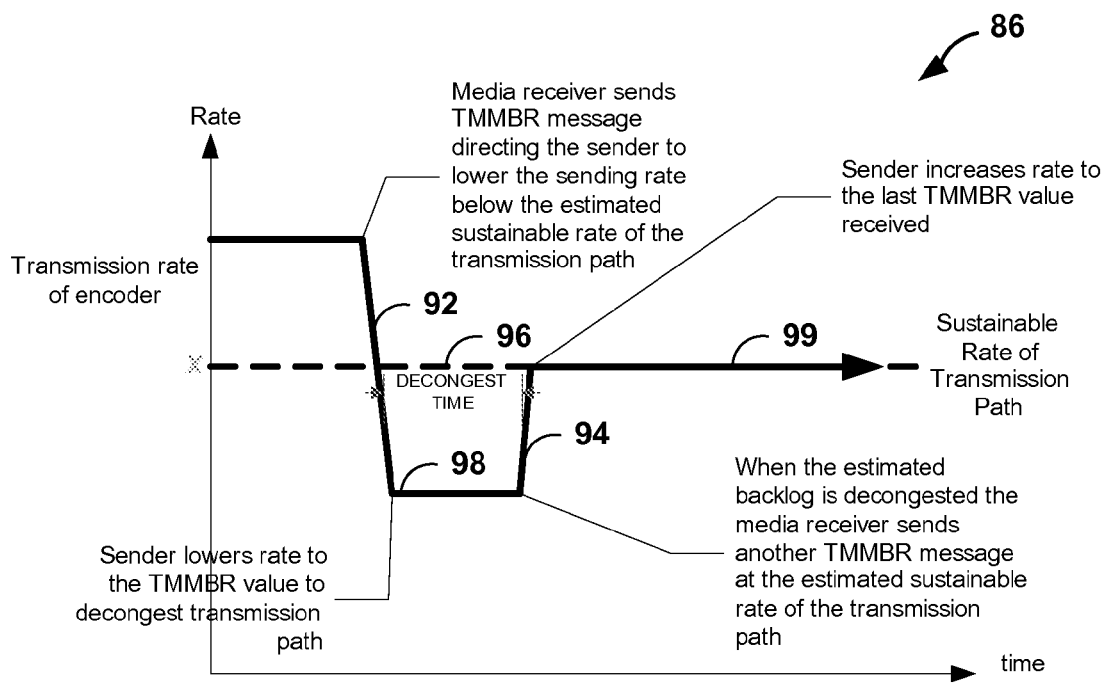
FIG. 5 is an annotated graph illustrating an example decongestion process according to the techniques of this disclosure.

FIG. 5 is an annotated graph 86 illustrating an example decongestion process performed by exemplary receiver-side rate adaptation module 70 and transmission-side rate adaptation module 50 according to the techniques of this disclosure. Receiver-side rate adaptation module 70 detects congestion on a shared downlink according to one or more media receiver parameters 81 and sends feedback 31 to transmission-side rate adaptation module 50. In exemplary graph 86, feedback 31 includes a TMMBR message directing transmission-side rate adaptation module 50 to lower the transmission rate below the estimated sustainable rate of the transmission path. The TMMBR message includes a TMMBR value 98 that specifies the lower transmission rate. Transmission-side rate adaptation module 50 reduces its transmission rate at ramp down rate 92 (as specified by RAMP_DOWN_RATE 83E). Reducing the transmission rate by a media sender, e.g., video server 40, allows the network that includes the media sender to reduce a backlog of congested packets.

Receiver-side rate adaptation module 70 then waits for a time specified by DECONGEST_TIME 81P before sending additional feedback 31 in the form of a second TMMBR message directing transmission-side rate adaptation module 50 to increase the transmission rate to a second TMMBR value 99. In the example annotated graph 86, the new transmission rate approximates the estimate sustainable rate of the transmission path. Transmission-side rate adaptation module 50 increases its transmission rate at ramp up rate 94 (as specified by RAMP_UP_RATE 83D).

In general, a small value for DECONGEST_TIME 81P indicates that receiver-side rate adaptation module 70 should perform aggressive decongestion and set TMMBR value 98 (specifying the transmission rate for decongestion) significantly below the highest sustainable rate of the transmission path. Contrariwise, a large value for DECONGEST_TIME 81P indicates that receiver-side rate adaptation module 70 should perform conservative decongestion and set TMMBR value 98 below, but nearer to, the highest sustainable rate of the transmission path. A value of zero for DECONGEST_TIME 81P indicates that receiver-side rate adaptation module 70 should not direct transmission-side rate adaptation module 50 to perform any decongestion. In some aspects, a network operator specifies values for DECONGEST 81O to control the level of decongestion intensity.

Figure 6:
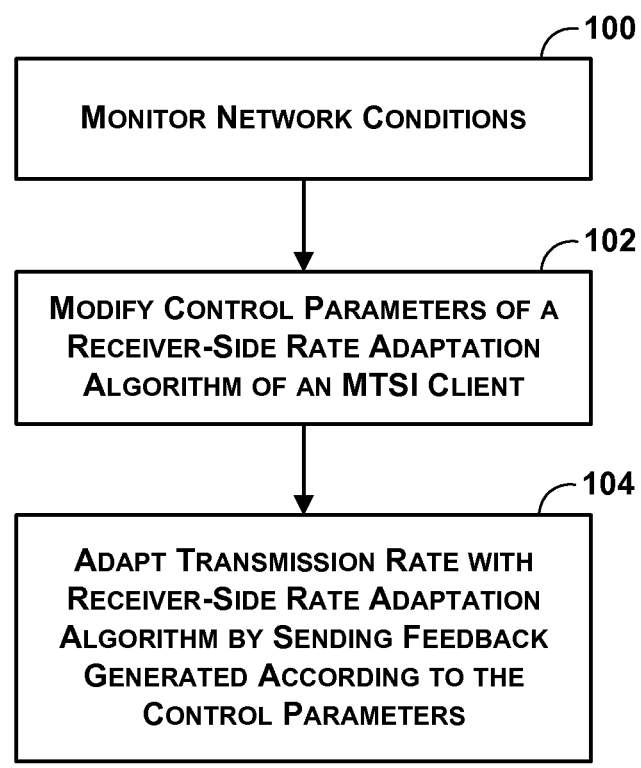
FIGS. 6-8 are flowcharts illustrating exemplary operations of a provisioning server and a media terminal according to the techniques of this disclosure.

FIG. 6 is a flowchart illustrating an exemplary operation of provisioning server 10 and video terminal 60 operating in UMTS network 2 according to the techniques of this disclosure. Initially, a network operator monitors the network conditions in UMTS network 2 (100) and the quality of experience at the UEs. Based on the network conditions and measured quality of experience, the network operator uses provisioning server 10 to modify one or more of media receiver control parameters 71 of receiver-side rate adaptation module 70 in receiving MTSI client 64 of video terminal 60 (102). Receiver-side rate adaptation module 70 operates according to the modified media receiver control parameters 71 in order to adapt the transmission rate experienced by video terminal 60 by generating and sending feedback 31 to video server 40 (104).

Figure 7:
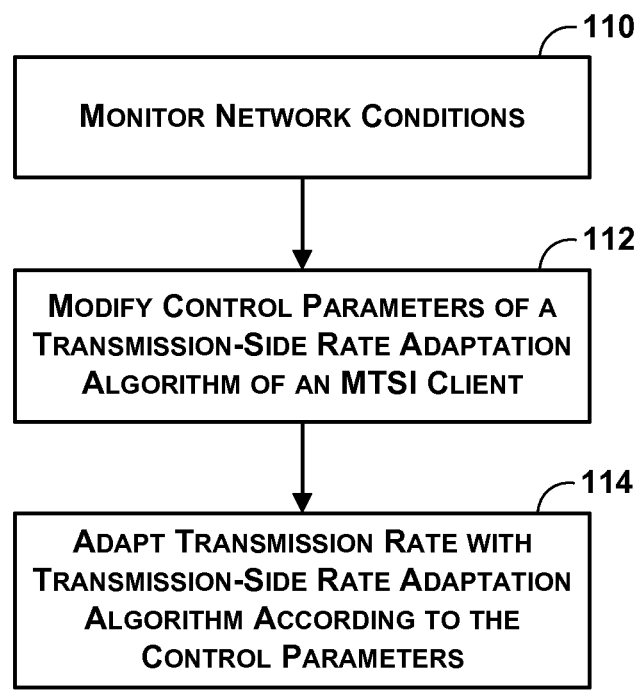

FIG. 7 is a flowchart illustrating an exemplary operation of provisioning server 10 and video server 40 operating in UMTS network 2 according to the techniques of this disclosure. Initially, a network operator monitors the network conditions in UMTS network 2 (110) and the quality of experience at the UEs. Based on the network conditions and measured quality of experience, the network operator uses provisioning server 10 to modify one or more of media sender control parameters 51 of transmission-side rate adaptation module 50 in sending MTSI client 44 of video server 40 (112). Transmission-side rate adaptation module 50 operates according to the modified media sender control parameters 51 in order to adapt the transmission rate for video server 40 (114). Video server 40 may adapt the transmission rate by altering an encoding rate for a video stream.

Figure 8:
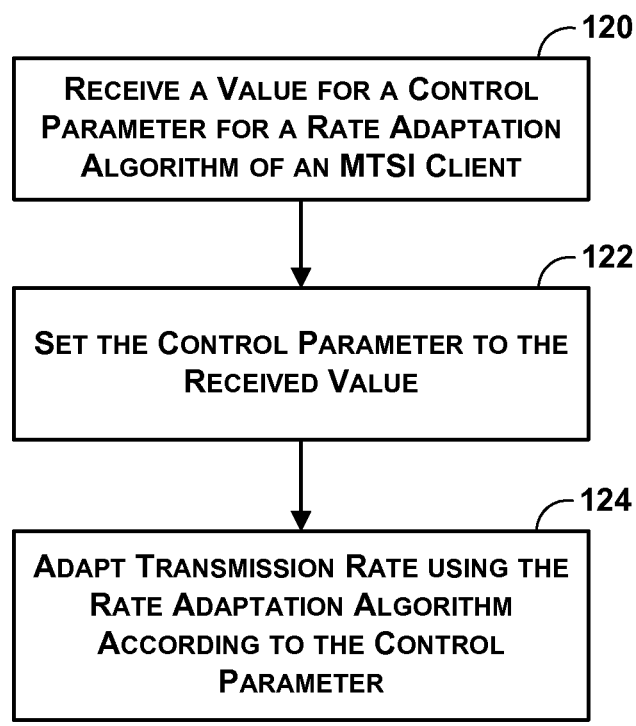

FIG. 8 is a flowchart illustrating an exemplary operation of an MTSI client operating in UMTS network 2 according to the techniques of this disclosure. The MTSI client receives a value for a control parameter for a rate adaptation algorithm that is operated by the MTSI client for adapting the rate of a media encoder to network conditions (120). As one example, the MTSI client may receive the value for the control parameter from a provisioning server, such as provisioning server 10 described above. In response, the MTSI client sets the control parameter to the received value (122). In addition, the MTSI client begins operating the rate adaptation to adapt the transmission rate of a media encoder to network conditions in accordance with the newly set control parameter (124).

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
   receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of a first minimum feedback interval value for decreasing a maximum rate limit and a second minimum feedback interval value for increasing a maximum rate limit; and
   setting the first control parameter to the received value.

2. The method of claim 1, wherein the media device comprises a Multimedia Telephony Service for Internet Protocol Multimedia Systems (MTSI) client that comprises the rate adaptation algorithm.

3. The method of claim 1, wherein the plurality of control parameters include a plurality of subsets of service-specific control parameters each associated with one of a plurality of service levels, wherein each of the plurality of service levels defines a different quality of service for a user, and wherein the method further comprises:
   operating the media device according to a first one of the plurality of service levels, wherein the rate adaptation algorithm adjusts the coding rate of the media encoder based on the network conditions and a subset of service-specific control parameters associated with the first service level.

4. The method of claim 1,
   wherein the media device is a media receiver, and
   wherein the rate adaptation algorithm comprises a receiver-side rate adaptation algorithm and adjusts the coding rate of the media encoder by sending feedback to a media transmitter that includes the media encoder, wherein the feedback directs the media transmitter to adjust the coding rate of the media encoder.

5. The method of claim 1,
   wherein the media device is a media transmitter that includes the media encoder, and
   wherein the rate adaptation algorithm comprises a transmitter-side rate adaptation algorithm.

6. The method of claim 1, wherein the media encoder is a video encoder.

7. The method of claim 1, wherein the first control parameter is one of:
   a lower packet loss rate threshold;
   an upper packet loss rate threshold;
   a first packet loss rate measurement window that specifies a duration of a sliding window over which the rate adaptation algorithm measures the lower packet loss rate threshold; and
   a second packet loss rate measurement window that specifies a duration of a sliding window over which the rate adaptation algorithm measures the upper packet loss rate threshold.

8. An apparatus comprising:
   a rate adaptation module comprising a plurality of control parameters, wherein the rate adaptation module monitors conditions of a network and adjusts a coding rate of a media encoder based on the network conditions and the plurality of control parameters, wherein each of the plurality of control parameters specifies a threshold value or a timing value that controls a response of the rate adaptation module to the network conditions, wherein the first control parameter is one of a first minimum feedback interval value for decreasing a maximum rate limit and a second minimum feedback interval value for increasing a maximum rate limit; and
   a client that receives a value for a first one of the plurality of control parameters and sets the first control parameter to the received value.

9. The apparatus of claim 8, wherein the client comprises a Multimedia Telephony Service for Internet Protocol Multimedia Systems (MTSI) client that comprises the rate adaptation module.

10. The apparatus of claim 8,
    wherein the plurality of control parameters include a plurality of subsets of service-specific control parameters each associated with one of a plurality of service levels, wherein each of the plurality of service levels defines a different quality of service for a user,
    wherein the rate adaptation module adjusts the coding rate of the media encoder based on the network conditions and a subset of service-specific control parameters associated with a first one of the plurality of service levels.

11. The apparatus of claim 8,
    wherein the apparatus is a media receiver, and
    wherein the rate adaptation module comprises a receiver-side rate adaptation module and adjusts the coding rate of the media encoder by sending feedback to a media transmitter that includes the media encoder, wherein the feedback directs the media transmitter to adjust the coding rate of the media encoder.

12. The apparatus of claim 8, further comprising the media encoder,
    wherein the apparatus is a media transmitter, and
    wherein the rate adaptation module comprises a transmitter-side rate adaptation module.

13. The apparatus of claim 8, wherein the media encoder is a video encoder.

14. The apparatus of claim 8, wherein the apparatus comprises a wireless communication device handset.

15. The apparatus of claim 8, wherein the apparatus comprises one or more integrated circuit devices.

16. A device comprising:
    means for receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of a first minimum feedback interval value for decreasing a maximum rate limit and a second minimum feedback interval value for increasing a maximum rate limit; and means for setting the first control parameter to the received value.

17. The device of claim 16, wherein the device comprises a Multimedia Telephony Service for Internet Protocol Multimedia Systems (MTSI) client.

18. The device of claim 16, wherein the plurality of control parameters include a plurality of subsets of service-specific control parameters each associated with one of a plurality of service levels, wherein each of the plurality of service levels defines a different quality of service for a user, and wherein the device further comprises:

means for operating the device according to a first one of the plurality of service levels, wherein the rate adaptation algorithm adjusts the coding rate of the media encoder based on the network conditions and a subset of service-specific control parameters associated with the first service level.

19. The device of claim 16,
wherein the device is a media receiver, and
wherein the rate adaptation algorithm comprises a receiver-side rate adaptation algorithm and adjusts the coding rate of the media encoder by sending feedback to a media transmitter that includes the media encoder, wherein the feedback directs the media transmitter to adjust the coding rate of the media encoder.

20. The device of claim 16,
wherein the device is a media transmitter that includes the media encoder, and
wherein the rate adaptation algorithm comprises a transmitter-side rate adaptation algorithm.

21. The device of claim 16, wherein the media encoder is a video encoder.

22. A non-transitory computer-readable storage medium having stored thereon instructions that when executed cause one or more programmable processors to:

receive, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of a first minimum feedback interval value for decreasing a maximum rate limit and a second minimum feedback interval value for increasing a maximum rate limit; and set the first control parameter to the received value.

23. The non-transitory computer-readable storage medium of claim 22, wherein the media device comprises a Multimedia Telephony Service for Internet Protocol Multimedia Systems (MTSI) client that comprises the rate adaptation algorithm.

24. The non-transitory computer-readable storage medium of claim 22, wherein the plurality of control parameters include a plurality of subsets of service-specific control parameters each associated with one of a plurality of service levels, wherein each of the plurality of service levels defines a different quality of service for a user, and further comprising instructions to cause a programmable processor to:

operate the media device according to a first one of the plurality of service levels, wherein the rate adaptation algorithm adjusts the coding rate of the media encoder based on the network conditions and a subset of service-specific control parameters associated with the first service level.

25. The non-transitory computer-readable storage medium of claim 22,
wherein the media device is a media receiver, and
wherein the rate adaptation algorithm comprises a receiver-side rate adaptation algorithm and adjusts the coding rate of the media encoder by sending feedback to a media transmitter that includes the media encoder, wherein the feedback directs the media transmitter to adjust the coding rate of the media encoder.

26. The non-transitory computer-readable storage medium of claim 22,
wherein the media device is a media transmitter that includes the media encoder, and
wherein the rate adaptation algorithm comprises a transmitter-side rate adaptation algorithm.

27. The non-transitory computer-readable storage medium of claim 22, wherein the media encoder is a video encoder.

28. A method comprising:
receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
a minimum target playout margin that specifies a minimum acceptable time between a media packet arrival and its properly scheduled playout time,
a maximum target playout margin that specifies an upper threshold of time between a media packet arrival and its properly scheduled playout time,
a percentile point value for a packet arrival time distribution that specifies a percentile for measuring a playout margin,
a first target playout window that specifies a duration of a sliding window over which the rate adaptation algorithm observes and calculates a margin between media packet arrivals and playout for the minimum target playout margin, and
a second target playout window that specifies a duration of a sliding window over which the rate adaptation algorithm observes and calculates a margin between media packet arrivals and playout for the maximum target playout margin, and
setting the first control parameter to the received value.

29. An apparatus comprising:
a rate adaptation module comprising a plurality of control parameters, wherein the rate adaptation module monitors conditions of a network and adjusts a coding rate of a media encoder based on the network conditions and the plurality of control parameters, wherein each of the plurality of control parameters specifies a threshold value or a timing value that controls a response of the rate adaptation module to the network conditions, wherein the first control parameter is one of:
- a minimum target playout margin that specifies a minimum acceptable time between a media packet arrival and its properly scheduled playout time,
- a maximum target playout margin that specifies an upper threshold of time between a media packet arrival and its properly scheduled playout time,
- a percentile point value for a packet arrival time distribution that specifies a percentile for measuring a playout margin,
- a first target playout window that specifies a duration of a sliding window over which the rate adaptation algorithm observes and calculates a margin between media packet arrivals and playout for the minimum target playout margin, and
- a second target playout window that specifies a duration of a sliding window over which the rate adaptation algorithm observes and calculates a margin between media packet arrivals and playout for the maximum target playout margin, and a client that receives a value for a first one of the plurality of control parameters and sets the first control parameter to the received value.

30. A device comprising:

means for receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
- a minimum target playout margin that specifies a minimum acceptable time between a media packet arrival and its properly scheduled playout time,
- a maximum target playout margin that specifies an upper threshold of time between a media packet arrival and its properly scheduled playout time,
- a percentile point value for a packet arrival time distribution that specifies a percentile for measuring a playout margin,
- a first target playout window that specifies a duration of a sliding window over which the rate adaptation algorithm observes and calculates a margin between media packet arrivals and playout for the minimum target playout margin, and
- a second target playout window that specifies a duration of a sliding window over which the rate adaptation algorithm observes and calculates a margin between media packet arrivals and playout for the maximum target playout margin, and means for setting the first control parameter to the received value.

31. A non-transitory computer-readable storage medium having stored thereon instructions that when executed cause one or more programmable processors to:

receive, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
- a minimum target playout margin that specifies a minimum acceptable time between a media packet arrival and its properly scheduled playout time,
- a maximum target playout margin that specifies an upper threshold of time between a media packet arrival and its properly scheduled playout time,
- a percentile point value for a packet arrival time distribution that specifies a percentile for measuring a playout margin,
- a first target playout window that specifies a duration of a sliding window over which the rate adaptation algorithm observes and calculates a margin between media packet arrivals and playout for the minimum target playout margin, and
- a second target playout window that specifies a duration of a sliding window over which the rate adaptation algorithm observes and calculates a margin between media packet arrivals and playout for the maximum target playout margin, and set the first control parameter to the received value.

32. A method comprising:

receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of a decongest value and a decongest time value; and setting the first control parameter to the received value.

33. An apparatus comprising:

a rate adaptation module comprising a plurality of control parameters, wherein the rate adaptation module monitors conditions of a network and adjusts a coding rate of a media encoder based on the network conditions and the plurality of control parameters, wherein each of the plurality of control parameters specifies a threshold value or a timing value that controls a response of the rate adaptation module to the network conditions, wherein the first control parameter is one of a decongest value and a decongest time value; and a client that receives a value for a first one of the plurality of control parameters and sets the first control parameter to the received value.

34. A device comprising:

means for receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter one of a decongest value and a decongest time value; and means for setting the first control parameter to the received value.

35. A non-transitory computer-readable storage medium having stored thereon instructions that when executed cause one or more programmable processors to:
- receive, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of a decongest value and a decongest time value; and
- set the first control parameter to the received value.

36. A method comprising:
- receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
  - a ramp up rate that specifies a rate at which the rate adaptation algorithm is to increase a target encoding rate to a higher rate limit, and
  - a ramp down rate that specifies a rate at which the rate adaptation algorithm is to decrease the target encoding rate to a lower rate limit, and
- setting the first control parameter to the received value.

37. An apparatus comprising:
- a rate adaptation module comprising a plurality of control parameters, wherein the rate adaptation module monitors conditions of a network and adjusts a coding rate of a media encoder based on the network conditions and the plurality of control parameters, wherein each of the plurality of control parameters specifies a threshold value or a timing value that controls a response of the rate adaptation module to the network conditions, wherein the first control parameter is one of:
  - a ramp up rate that specifies a rate at which the rate adaptation algorithm is to increase a target encoding rate to a higher rate limit, and
  - a ramp down rate that specifies a rate at which the rate adaptation algorithm is to decrease the target encoding rate to a lower rate limit, and
- a client that receives a value for a first one of the plurality of control parameters and sets the first control parameter to the received value.

38. A device comprising:
- means for receiving, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
  - a ramp up rate that specifies a rate at which the rate adaptation algorithm is to increase a target encoding rate to a higher rate limit, and
  - a ramp down rate that specifies a rate at which the rate adaptation algorithm is to decrease the target encoding rate to a lower rate limit, and
- means for setting the first control parameter to the received value.

39. A non-transitory computer-readable storage medium having stored thereon instructions that when executed cause one or more programmable processors to:
- receive, by a media device, a value for a first one of a plurality of control parameters for a rate adaptation algorithm, wherein the rate adaptation algorithm monitors conditions of a network and adjusts a coding rate of a media encoder based on the network conditions and the plurality of control parameters, wherein each of the plurality of control parameters specifies a threshold value or a timing value that controls a response of the rate adaptation algorithm to the network conditions, wherein the first control parameter is one of:
  - a ramp up rate that specifies a rate at which the rate adaptation algorithm is to increase a target encoding rate to a higher rate limit, and
  - a ramp down rate that specifies a rate at which the rate adaptation algorithm is to decrease the target encoding rate to a lower rate limit, and
- set the first control parameter to the received value.

* * * * *